United States Patent [19]

Davis et al.

[11] 4,213,862
[45] Jul. 22, 1980

[54] GRAVITY SETTLING

[75] Inventors: H. R. Davis, Glenridge; R. H. Long, Morristown; A. A. Simone, Dover, all of N.J.

[73] Assignee: The Lummus Company, Bloomfield, N.J.

[21] Appl. No.: 901,295

[22] Filed: May 1, 1978

Related U.S. Application Data

[60] Division of Ser. No. 835,498, Sep. 22, 1977, Pat. No. 4,133,758, which is a continuation-in-part of Ser. No. 720,686, Sep. 7, 1976, abandoned.

[51] Int. Cl.$^2$ ............................................ B01D 21/10
[52] U.S. Cl. ...................................... 210/83; 210/522
[58] Field of Search .................. 210/84, 305, 330, 532, 210/515, 534, 251, 513, 537, 538, 73 R, 730 W, 242, 521, 522, 83

[56] References Cited

U.S. PATENT DOCUMENTS

| | | | |
|---|---|---|---|
| 2,022,661 | 12/1935 | Fortier | 210/521 |
| 3,703,467 | 11/1972 | Lummus et al. | 210/522 |

FOREIGN PATENT DOCUMENTS 22,546  12/1892  United Kingdom ..................... 210/522

*Primary Examiner*—Frank Sever
*Attorney, Agent, or Firm*—Louis E. Marn; Elliot M. Olstein

[57] ABSTRACT

Solids are separated from a liquid in a gravity settler provided with inclined solid intercepting surfaces to intercept the solid settling path to coalesce the solids and increase the settling rate. The intercepting surfaces are inverted V-shaped plates, each formed from first and second downwardly inclined essentially planar sections which extend from the apex within the vessel to the lower portion thereof adjacent the vessel wall.

6 Claims, 1 Drawing Figure

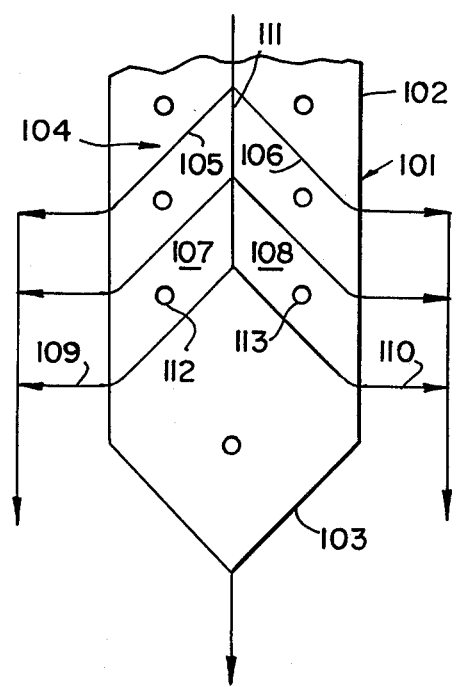

bons containing more than 12 carbon atoms; white oils or white oil fraction derived from crude oils; alpha-olefins containing more than 12 carbon atoms; fully hydrogenated naphthalenes and substituted naphthalenes; propylene oligomers (pentamer and higher); tetrahydronaphthalene, heavy naphtha fractions, etc. The most preferred liquids are kerosene fractions; white oils; fully hydrogenated naphthalenes and substituted naphthalenes.

The amount of liquid promoter used for enhancing and promoting the separation of insoluble matter from the coal liquefaction product will vary with the particular liquid employed, the coal liquefaction solvent, the coal used as starting material and the manner in which the liquefaction is effected. As should be apparent to those skilled in the art, the amount of liquid promoter used should be minimized in order to reduce the overall costs of the process. It has been found that by using the liquid of controlled aromaticity, the desired separation of insoluble material may be effected with modest amounts of liquid promoter. In general, the weight ratio of liquid promoter to coal solution may range from about 0.2:1 to about 3.0:1, preferably from about 0.3:1 to about 1.5:1. In using the preferred promoter liquid of the present invention which is a kerosene fraction having 5 percent and 95 percent volume distillation temperatures of 425° F. and 500° F. respectively, promoter liquid to coal solution weight ratios in the order of 0.4:1 to 0.6:1 have been particularly successful. It is to be understood, however, that greater amounts of liquid promoter may be employed, but the use of such greater amounts is uneconomical. In addition, the use of an excess of liquid promoter may result in the precipitation or separation of an excessive amount of desired coal derived products from the coal extract. More particularly, as the amount of liquid promoter employed is increased, a greater amount of ash is separated from the coal solution, but such an increased separation is accompanied by an increased separation of desired coal derived products from the coal solution. The net coal product (the extracted carbonaceous matter, excluding the promoter liquid, liquefaction solvent and gas make) contains less The gravity settling is generally effected as temperatures from about 300° F. to about 600° F., preferably from about 350° F. to about 500° F., and a pressure from about 0 psig to about 500 psig, preferably at a pressure from about 0 psig to about 300 psig. It is to be understood, however, that higher pressures could be employed, but as should be apparent to those skilled in the art, lower pressures are preferred.

Although the present invention is particularly suitable for effecting liquid-solid separation of solid particulate material from a coal liquefaction product, it is to be understood that the present invention is suitable for effecting any one of a wide variety of liquid-solid mixtures by gravity settling. Thus, for example, the gravity settler of the present invention may also be employed for the removal of char fines from oils produced from pyrolysis of coals; finely dispersed solid particles in kerogen retorted from shale, tar sands, oil shale, and the like. The use of gravity settling in accordance with the invention for these applications and others should be apparent to those skilled in the art from the teachings herein.

Although the present invention has been described with respect to the preferred gravity settling apparatus of the present invention, it is to be understood that gravity settling can be effected in accordance with the invention in other forms of apparatus provided with intercepting surfaces for intercepting the solids settling path to cause coalescing of the solids and increase the settling rate.

Numerous modifications and variations of the present invention are possible in light of the above teachings and, therefore, within the scope of the appended claims, the invention may be practiced otherwise than as particularly described.

What is claimed is:

1. A gravity settler for effecting solid-liquid separation, comprising:
   a vessel, at least two vertically spaced essentially planar inverted V-shaped plates within the vessel, each of said inverted V-shaped plates being comprised of first and second downwardly oppositely inclined essentially planar sections which extend from the apex of the inverted V-shaped plate within the vessel to the lower portion thereof, adjacent the vessel wall, said at least two vertically spaced inverted V-shaped plates defining a substantially enclosed liquid-solid separating chamber therebetween;
   inlet means for introducing liquid-solid feed into said chamber;
   first and second underflow outlet means positioned above and adjacent to the lower portions of said first and second sections of the lower of the at least two inverted V-shaped plates; and
   overflow outlet means below and adjacent to the apex of the higher of the at least two inverted V-shaped plates for withdrawing clarified liquid from said chamber.

2. The apparatus of claim 1 wherein the inlet means is comprised of first and second inlet pipes for introducing feed into first and second portions of the chamber above the first and second sections of the inverted V-shaped plates.

3. The apparatus of claim 1 wherein said first and second sections are inclined at an angle of from 45° to 75° with respect to horizontal.

4. The apparatus of claim 1 wherein the inverted V-shaped plates are corrugated to provide additional surface for coalescing of solids.

5. A process for separating solids from a coal liquefaction product by gravity settling, comprising:
   introducing a coal liquefaction product containing dispersed solids into a gravity settler at multiple locations; intercepting the settling path of the solids below each of the feed locations by bringing the solids into contact with essentially planar inclined intercepting surfaces which divide the gravity settler into separate separation zones within the settler to the lower portion thereof, thereby coalesce the solids and increase the solids settling rate, said inclined, intersecting surfaces being at least two vertically spaced, inverted V-shaped plates each being comprised of first and second downwardly oppositely inclined essentially planar sections which extend from the apex of the inverted V-shaped plate to adjacent the settler wall, said at least two vertically spaced inverted V-shaped plates defining a substantially enclosed separation zone therebetween; recovering solids containing underflow from the separate separation zones; and recovering an essentially solids free overflow from the separation zones.

6. The process of claim 5 wherein the coal liquefaction product includes a promoter liquid which promotes and enhances the separation of solids.

* * * * *

GRAVITY SETTLING

This application is a division of U.S. application Ser. No. 835,498, filed Sept. 22, 1977, now U.S. Pat. No. 4,133,758, with the aforesaid application being a continuation in part of U.S. application Ser. No. 720,686, filed on Sept. 7, 1976, and now abandoned.

This invention relates to liquid-solid separation, and more particularly, to liquid-solid separation by gravity settling.

In many operations, there is a need for effecting separation of solids from a liquid. Thus, for example, in U.S. Pat. No. 3,856,675, there is disclosed an improved process for separating insoluble material from a coal liquefaction product wherein such insoluble material is separated by gravity settling in the presence of a promoter liquid having specific characteristics. In such a process, and similar processes, there is a need for improved apparatus for effecting such gravity settling.

An object of the present invention is to provide for an improved liquid-solid separation by gravity settling.

A further object of the present invention is to provide for improved separation of insoluble material from a coal liquefaction product by gravity settling.

These and other objects of the present invention should become more readily apparant from reading the following detailed description thereof.

In accordance with one aspect of the present invention, there is provided a process for separating solids from a liquid by gravity settling wherein a liquid-solid mixture is introduced into a gravity settler at multiple locations and the settling paths of the solids are intercepted in the gravity settler by causing the solids to come into contact with intercepting surfaces to coalesce the solids and increase the solids settling rate with the intercepting surfaces being inverted V-shaped plates, each formed from first and second downwardly oppositely inclined essentially planar sections which extend from the apex of the inverted V-shaped plate within the vessel to the lower portion thereof adjacent the vessel wall.

In accordance with another aspect of the present invention, there is provided a gravity settler for effecting liquid/solid separation in which the gravity settler is provided with intercepting surfaces to intercept the settling path of the solids, with the intercepting surfaces being at least two vertically spaced inverted V-shaped plates, each formed from first and second downwardly oppositely inclined essentially planar sections which extend from the apex of the inverted V-shaped plate within the settler to the lower portions thereof adjacent the settler wall. The plates form a gravity settling zone therebetween, and a fresh feed inlet means introduces solids dispersed in a liquid into the gravity settling zone. Each gravity settling zone is provided with an overflow outlet for withdrawing an essentially solids free liquid, and an underflow outlet for withdrawing solid containing liquid.

The invention will be further described with respect to the accompanying drawing, wherein:

The drawing is a simplified schematic drawing of an embodiment of the gravity settler of the present invention.

Referring to the drawing, there is shown a gravity settling vessel 101, having a cylindrical upper portion 102 and a conically shaped lower portion 103, is divided into a plurality of separate liquid-solid separation zones or chambers by inclined solid intercepting surfaces in the form of generally inverted V-shaped plates 104 having oppositely slanted portions 105 and 106, with each of the oppositely slanted portions being sloped at an angle with respect to horizontal of from 45° to 75°. The inverted V-shaped plates 104 define therebetween two liquid-solid separation chambers 107 and 108. Each of the separate solid separation chambers 107 and 108 is provided with an underflow outlet 109 and 110, respectively, with a combined overflow being withdrawn from the upper portion of each of the chambers 107 and 108, with such overflow withdrawal means being schematically indicated as 111. The outlet withdrawal means 111 would be comprised of a plurality of riser pipes which discharge into each other. Each of the separate chambers 107 and 108 is provided with a fresh feed inlet for introducing a liquid-solid feed, with such feed inlets being schematically represented as 112 and 113.

In operation, a liquid-solid feed is introduced into the chamber 107 through inlet 112, and the solids which settle are intercepted by the plate 105 for ultimate withdrawal through underflow outlet 109. Similarly, liquid-solid feed introduced through inlet 113 is separated in chamber 108, with settled solids being intercepted by plate 106 for ultimate withdrawal through outlet 110.

Although the embodiment has been particularly described with respect to separate underflow withdrawal from each of the chambers, it is to be understood that underflow withdrawal may be effected in a combined manner. Similarly, overflow withdrawal can be effected other than as particularly described.

The gravity settler of the present invention is particularly suitable for separating insoluble material from a coal liquefaction product wherein the gravity settling is effected in the presence of a promoter liquid.

The coal liquefaction product is introduced into the gravity settler in admixture with a promoter liquid, as net feed, with the promoter liquid having the properties described in U.S. Pat. No. 3,856,675. As described in the aforementioned patent, the promoter liquid is one that has an aromaticity less than that of the liquefaction solvent and is generally a hydrocarbon liquid having a characterization factor (K) of at least about 9.75 and preferably at least about 11.0, with such characterization factor being an index of the aromaticity/parafinicity of hydrocarbons and petroleum fractions as disclosed by Watson and Nelson, Ind. Eng. Chem. 25 880 (1933). The liquid which is used to enhance and promote the separation of insoluble material is further characterized by a 5 volume percent distillation temperature of at least about 250° F. and a 95 volume percent distillation temperature of at least about 350° F. and no greater than about 750° F. The promoter liquid preferably has a 5 volume percent distillation temperature of at least about 310° F. and most preferably of at least about 400° F. The 95 volume percent distillation temperature is preferably no greater than about 600° F. The most preferred promoter liquid has a 5 volume percent distillation temperature of at least about 425° F. and a 95 volume percent distillation temperature of no greater than about 500° F.

As representative examples of such liquids, there may be mentioned: kerosene or kerosene fraction from paraffinic or mixed base crude oils; middle distillates, light gas oils and gas oil fractions from paraffinic or mixed based crude oils; alkyl benzenes with side chains containing 10 or more carbon atoms; paraffinic hydrocar-

UNITED STATES PATENT OFFICE
CERTIFICATE OF CORRECTION

Patent No. 4,213,862                    Dated July 22, 1980

Inventor(s) H.R. Davis, R.H. Long, and A.A. Simone

It is certified that error appears in the above-identified patent and that said Letters Patent are hereby corrected as shown below:

In the specification

Col. 3, line 42 please add the following:

--than about 1% insoluble material, generally less than 0.1% insoluble material, and most preferably less than 0.05% insoluble material, all by weight.--

Signed and Sealed this

Eleventh Day of August 1981

[SEAL]

Attest:

Attesting Officer

GERALD J. MOSSINGHOFF

Commissioner of Patents and Trademarks